(12) United States Patent
Cwalina et al.

(10) Patent No.: US 7,150,008 B2
(45) Date of Patent: Dec. 12, 2006

(54) NON-INVASIVE RULE-BASED BINARY ANALYSIS OF SOFTWARE ASSEMBLIES

(75) Inventors: Krzysztof J. Cwalina, Redmond, WA (US); Nathan Keith Walker, Grand Rapids, MI (US); Michael C. Fanning, Kirkland, WA (US); Bradley M. Abrams, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 648 days.

(21) Appl. No.: 10/413,254

(22) Filed: Apr. 14, 2003

(65) Prior Publication Data

US 2004/0083464 A1    Apr. 29, 2004

Related U.S. Application Data

(60) Provisional application No. 60/421,358, filed on Oct. 25, 2002.

(51) Int. Cl.
G06F 9/45 (2006.01)
(52) U.S. Cl. .................................... 717/126
(58) Field of Classification Search ............... 717/104, 717/126
See application file for complete search history.

(56) References Cited

U.S. PATENT DOCUMENTS

| | | | | |
|---|---|---|---|---|
| 5,652,835 A | * | 7/1997 | Miller | 714/38 |
| 5,860,011 A | * | 1/1999 | Kolawa et al. | 717/142 |
| 6,067,639 A | * | 5/2000 | Rodrigues et al. | 714/38 |
| 6,247,174 B1 | * | 6/2001 | Santhanam et al. | 717/154 |
| 6,473,896 B1 | * | 10/2002 | Hicken et al. | 717/132 |
| 6,993,747 B1 | * | 1/2006 | Friedman | 717/124 |
| 2003/0182643 A1 | * | 9/2003 | Crouse et al. | 716/5 |
| 2004/0168152 A1 | * | 8/2004 | Kramer | 717/120 |

* cited by examiner

*Primary Examiner*—John Chavis
(74) *Attorney, Agent, or Firm*—Workman Nydegger (57) ABSTRACT

Checking program elements and program element behaviors for adherence to software development rules. An analysis engine receives a rule assembly containing metadata and intermediate language instructions representing one or more rules. The analysis engine also receives a target assembly containing metadata and intermediate language instructions representing one or more program elements and/or one or more program element behaviors. The analysis engine identifies (e.g., through reflection or retrieval of intermediate language instructions) a program element or program element behavior from the target assembly that is to be checked for adherence to a rule from the rule assembly. The analysis engine applies the rule to the program element or program element behavior to check the program element or program element behavior for adherence to the rule. Results can be stored for later viewing by a programmer.

23 Claims, 4 Drawing Sheets

NON-INVASIVE RULE-BASED BINARY ANALYSIS OF SOFTWARE ASSEMBLIES

CROSS-REFERENCE TO RELATED APPLICATIONS

The present application claims priority from U.S. provisional patent application Ser. No. 60/421,358, filed Oct. 25, 2002 and entitled "Extensible Rule-Based Architecture For Non-Invasive Binary Analysis" which provisional application is incorporated herein by reference in its entirety.

BACKGROUND OF THE INVENTION

1. The Field of the Invention

The present invention relates to software development technology. More specifically, the present invention relates to analyzing a software assembly to determine if the software assembly was developed in accordance with a set of development rules.

2. Background and Related Art

Computers have revolutionized the way we work and play. There are an enormous variety of functions and applications that may be implemented by a general purpose computing system in response to the execution of a software application. The utility and functionality of the computing system does, however, rely on the proper coding of the source code that was compiled or interpreted into the binary instructions that are actually executed by the processor. If there is a coding or design error, this will often result in a deviation from expected behavior.

Extraordinary efforts are currently in place to reduce the number of unexpected performance deviations in many software applications before and after the software applications are shipped to market. However, the creativity of software programmers and designers has led to increasingly complex and powerful software applications. As the complexity of the software application increases, so often does the number of lines of source code needed to generate the software application.

Accordingly, it is often advantageous to develop software in accordance with a set of design guidelines. This helps insure that a module of a software application is developed in a similar manner even if different programmers and/or designers work on the module. During development of a software application, there are frequently a number of different design guidelines that may be appropriate. That is, there is often no "right way" or "wrong way" to develop a software application. However, to further streamline the development process, a set of uniform design guidelines are often selected. Use of uniform design guidelines allows designers and programmers to move between the development of different modules of a software application without having to re-learn design guidelines for each module.

Unfortunately, when a software application is developed, there is often no mechanism for efficiently distributing a complete set of uniform design guidelines to all the designers and programmers developing the software application. For example, different portions of uniform design guidelines may be distributed in an ad-hoc manner across a number of different publications and Web sites. In some cases, certain designers or programmers may know the complete set of uniform design guidelines (or portions thereof) and distribute information about the uniform design guidelines only when questioned by other designers or programmers. Distribution of uniform design guidelines across publications, Web sites, and word of mouth is inefficient and often proves insufficient for large development groups.

Further, even when a designer or programmer is aware of uniform design guidelines, there may be no way to determine if the designer or programmer is adhering to the uniform design guidelines. For example, even though a programmer is aware that method names should adhere to Pascal Casing (i.e., capitalizing the first letter of each new word), the programmer may none-the-less program and compile a module that uses some other naming convention. Once a module is compiled, it may be difficult to determine whether or not the module adheres to uniform design guidelines.

Accordingly, some mechanisms have been developed to automatically check a compiled module to determine if the compiled module was designed and programmed in accordance with uniform design guidelines. These mechanisms typically include a software tool that is programmed and compiled to include logic for the uniform design guidelines that are to be checked. The software tool receives a compiled module as input and applies the included logic to attempt to determine if the compiled module adheres to the uniform design guidelines represented by the logic. However, to utilize such a software tool, methods for accessing the functionality of the software tool (commonly referred to as a "hooks") must be included in a compiled module. Further, when uniform design guidelines change, the software tool (and potentially modules with corresponding hooks to the software tool) must be re-coded and recompiled. Alternately, a software tool can be configured to directly analyze source code or machine language. However, use of source code analysis tools makes multi-language analysis very difficult as an analysis tool is typically configured for use with a single programming langue. Also, during compilation from source code to machine language some information is lost. Accordingly, machine language analysis tools may not be able to analyze all the aspects of a module.

Thus, a programmer may need to maintain multiple versions of source code, for example, a production version and a test version that includes hooks for the software tool. Unfortunately, when non-adherence to uniform design guidelines is identified in the test version, there is no guarantee that corrections will be incorporated into the production version. Further, due to human error, a test version may in fact differ from the production version. Thus, the software tool may identify non-adherence in a test version, while a corresponding production version in fact adheres to the uniform design guidelines. On the other hand, the software tool can indicate that a test version adheres to uniform design guidelines, while a corresponding production version does not adhere to uniform design guidelines. Accordingly, what would be advantageous are mechanisms for analyzing a particular software assembly to determine if the particular software assembly was developed in accordance with specified rules.

BRIEF SUMMARY OF THE INVENTION

The foregoing problems with the prior state of the art are overcome by the principles of the present invention, which are directed towards systems, methods, and computer program products for analyzing a software assembly to determine if the software assembly was developed in accordance with a set of rules. An analysis engine receives a rule assembly containing metadata and intermediate language instructions representing one or more rules. Each rule in the rule assembly can be targeted to particular program elements (e.g., members, types, methods, properties, etc.) and/or program element behaviors (i.e., behaviors executed at runtime) and can indicate these targets to the analysis engine. Rules are extensible and can be developed for virtually any adherence policies (e.g., naming, security, reliability, etc.) Accordingly, a programmer (or tester) has increased control over the program elements and/or program element behaviors that are checked as well as the adherence policies that are checked for the program elements and/or program element behaviors.

The analysis engine also receives a target assembly containing metadata and intermediate language instructions representing a number of program elements and a number of program element behaviors. The analysis engine identifies rules that are targeted to the program elements and/or program element behaviors contained in the target assembly. The analysis engine can include a reflection module for inspecting metadata and an intermediate instruction retrieval module for inspecting intermediate language instructions. Accordingly, the analysis engine can inspect program elements and program element behaviors contained in the target assembly (and rules contained in the rule assembly) and determine if any program elements or program element behaviors are targets for any rules.

The analysis engine applies a rule to an identified program element or program element behavior to check the program element or program element behavior for adherence to the rule. An adherence module included in the analysis engine can dynamically invoke (instantiate) the rule to cause the rule to be created in system memory. The adherence module then applies the rule to the program element or program element behavior to check the program element or program element behavior for adherence to the rule.

Both the rule assembly and the target assembly can be language independent portable executables. Accordingly, rules developed in one computing environment can easily be used to analyze program elements and/or program element developed in another different computing environment. The analysis engine can be configured to receive portable executables as input and inspect metadata and intermediate language instructions included in the portable executables.

In some embodiments, the analysis engine is built into an integrated development environment. As a programmer develops an assembly, the analysis engine automatically checks program elements and program element behaviors as they are added to the assembly. This can include checking an assembly in response to receiving user-input that causes compilation of source code and checking a compiled assembly. In these embodiments, the analysis engine can check for adherence to supplemental rules that supplement inherent rules included in the components (e.g., compiler, editor, or debugger) of the integrated development environment.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to methods, systems, and computer program product for checking a program element or program element behavior in a target assembly for adherence to a rule in a rules assembly. An analysis engine receives a rule assembly containing metadata and intermediate language instructions representing one or more rules. The analysis engine also receives a target assembly containing metadata and intermediate language instructions representing one or more program elements and/or one or more program element behaviors. The analysis engine identifies (e.g., through reflection or retrieval of intermediate language instructions) a program element or program element behavior from the target assembly that is to be checked for adherence to a rule from the rule assembly. The analysis engine applies the rule to the program element or program element behavior to check the program element or program element behavior for adherence to the rule.

The embodiments of the present invention may comprise a special purpose or general-purpose computer including various computer hardware and software, as discussed in greater detail below. In particular, embodiments within the scope of the present invention include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other physical storage media, such as optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device, such as a GPU, to perform a certain function or group of functions.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced with many types of computer system configurations, including, personal computers, laptop computers, multi-processor systems, minicomputers, mainframe computers, and the like. The invention may also be practiced in distributed system environments where local and remote computer systems, which are linked (either by hardwired links, wireless links, or by a combination of hardwired and wireless links) through a network, both perform tasks. In a distributed system environment, program modules and associated data structures may be located in both local and remote memory storage devices.

Figure 1:
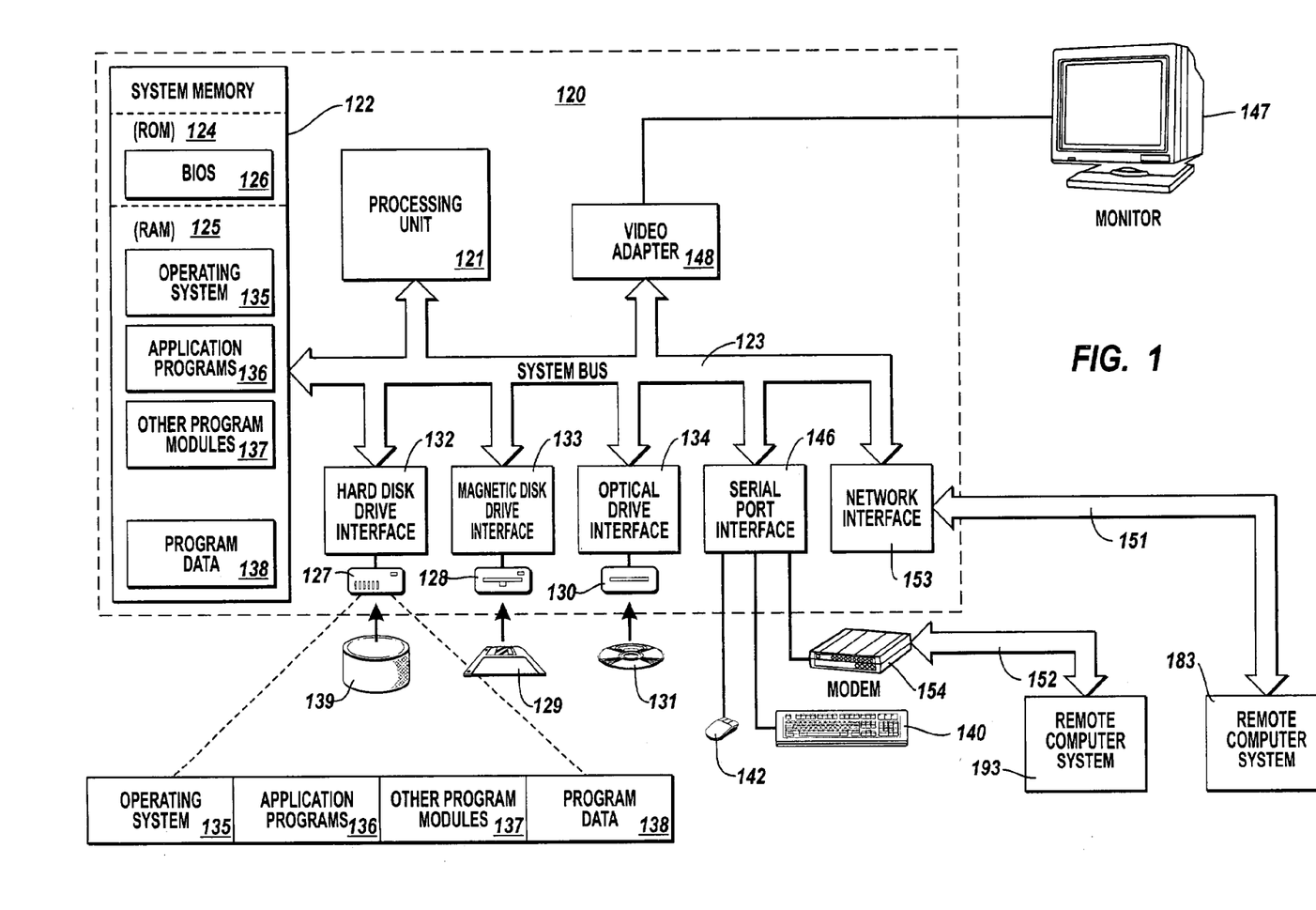
FIG. 1 illustrates a suitable operating environment for the principles of the present invention.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 1, an example system for implementing the invention includes a general-purpose computing device in the form of computer system 120, including a processing unit 121, a system memory 122, and a system bus 123 that couples various system components including the system memory 122 to the processing unit 121. Processing unit 121 can execute computer-executable instructions designed to implement features of computer system 120, including features of the present invention. The system bus 123 may be any of several types of bus structures including a memory bus or memory controller, a peripheral bus, and a local bus using any of a variety of bus architectures. The system memory includes read only memory ("ROM") 124 and random access memory ("RAM") 125. A basic input/output system ("BIOS") 126, containing the basic routines that help transfer information between elements within the computer 120, such as during startup, may be stored in ROM 124.

The computer system 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131, such as, or example, a CD-ROM or other optical media. The magnetic hard disk drive 127, magnetic disk drive 128, and optical disk drive 130 are connected to the system bus 123 by hard disk drive interface 132, magnetic disk drive-interface 133, and optical drive interface 134, respectively. The drives and their associated computer-readable media provide nonvolatile storage of computer-executable instructions, data structures, program modules, and other data for computer system 120. Although the example environment described herein employs a magnetic hard disk 139, a removable magnetic disk 129 and a removable optical disk 131, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer system 120 through keyboard 140, pointing device 142, or other input devices (not shown), such as, for example, a microphone, joy stick, game pad, scanner, or the like. These and other input devices can be connected to the processing unit 121 through serial port interface 146 coupled to system bus 123. Alternatively, input devices can be connected by other interfaces, such as, for example, a parallel port, a game port, a universal serial bus ("USB") port, or a Fire Wire port. A monitor 147 or other display device is also connected to system bus 123 via video interface 148. Computer system 120 can also be connected to other peripheral output devices (not shown), such as, for example, speakers and printers.

Computer system 120 is connectable to networks, such as, for example, an office-wide or enterprise-wide computer network, an intranet, and/or the Internet. Computer system 120 can exchange data with external sources, such as, for example, remote computer systems, remote applications, and/or remote databases over such a network.

Computer system 120 includes network interface 153, through which computer system 120 receives data from external sources and/or transmits data to external sources. As depicted in FIG. 1, network interface 153 facilitates the exchange of data with remote computer system 183 via communication link 151. Communication link 151 represents a portion of a network, and remote computer system 183 represents a node of the network. For example, remote computer system 183 may be a computer system that stores rule assemblies and/or target assemblies that are processed by an analysis engine in computer system 120. On the other hand, computer system 120 may store rule assemblies and/or target assemblies that are processed by an analysis engine by computer system 183.

Likewise, computer system 120 includes serial port interface 146, through which computer system 120 receives data from external sources and/or transmits data to external sources. Serial port interface 146 is coupled to modem 154, through which computer system 120 receives data from and/or transmits data to external sources. As depicted in FIG. 1, serial port interface 146 and modem 154 facilitate the exchange of data with remote computer system 193 via communication link 152. Communication link 152 represents a portion of a network, and remote computer system 193 represents a node of the network. For example, remote computer system 193 may be a computer system that stores rule assemblies and/or target assemblies that are processed by an analysis engine in computer system 120. On the other hand, computer system 120 may store rule assemblies and/or target assemblies that are processed by an analysis engine by computer system 193.

While FIG. 1 represents a suitable operating environment for the present invention, the principles of the present invention may be employed in any system that is capable of, with suitable modification if necessary, implementing the principles of the present invention. The environment illustrated in FIG. 1 is illustrative only and by no means represents even a small portion of the wide variety of environments in which the principles of the present invention may be implemented.

In accordance with the present invention, analysis engines, reflection modules, intermediate language retrieval modules, adherence modules, and integrated development environment ("IDE") components, as well as associated data, including rule assemblies, target assemblies, metadata, and intermediate language instructions can be stored and accessed from any of the computer-readable media associated with computer system 120. For example, portions of such modules and portions of associated program data may be included in operating system 135, application programs 136, program modules 137 and/or program data 138, for storage in system memory 122.

When a mass storage device, such as, for example, magnetic hard disk 139, is coupled to computer system 120, such modules and associated program data may also be stored in the mass storage device. In a networked environment, program modules and associated data depicted relative to computer system 120, or portions thereof, can be stored in remote memory storage devices, such as, for example, system memory and/or mass storage devices associated with remote computer system 183 and/or remote computer system 193. Execution of such modules may be performed in a distributed environment as previously described.

Figure 2:
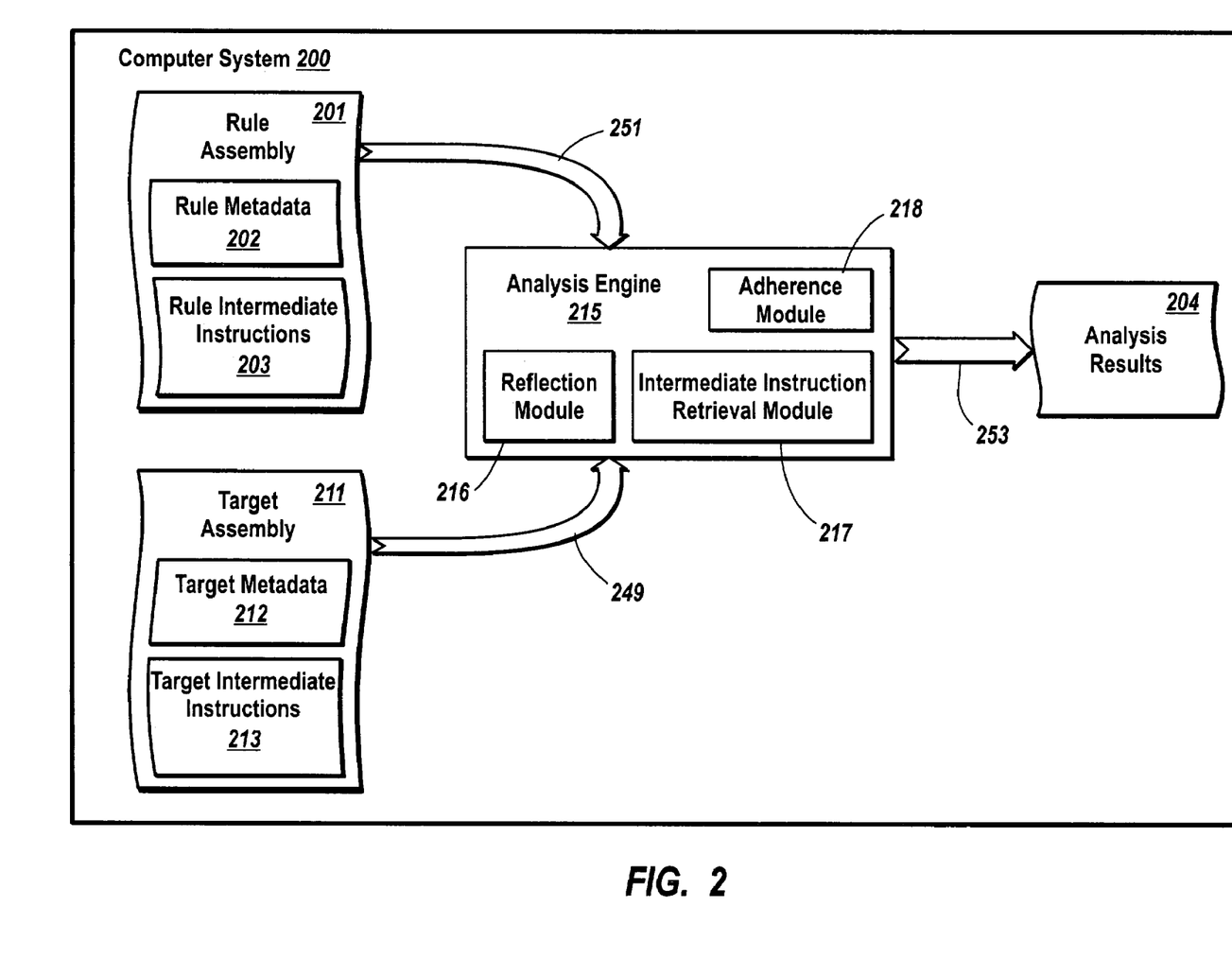
FIG. 2 illustrates an example of a computer system and associated modules and data structures for checking a target assembly for adherence to a rule in a rule assembly.

FIG. 2 illustrates an example of a computer system 200 and associated modules and data structures that cooperatively interact to check a program element or program element behavior in a target assembly for adherence to a rule in a rule assembly. The computer system 200 may be any computer system, such as, for example, computer system 120, capable of loading program elements and/or program element behaviors into memory. However, those skilled in the art will recognize after having reviewed this description, that any computer may implement the features of the presenting invention with suitable software and/or hardware.

The computer system 200 is checking a program element or program element behavior contained in target assembly 211 for adherence to a rule contained in rule assembly 201. It may be that for efficiency purposes a number of programmers choose to develop a software application in accordance with a set of rules. Since rules are maintained in a rule assembly and can be applied to a target assembly (e.g., an assembly of the software application) without having to manually enter additional code into the target assembly, a programmer can focus his or her attention to correcting non-adhering code, rather than attempting to identify non-adhering code him or herself.

The rectangular elements in computer system 200 (analysis engine 215, reflection module 216, intermediate language retrieval module 217, and adherence module 218) represent executable modules that facilitate checking for adherence. The scrolled elements (rule assembly 201, target assembly 211, and results 204) represent data that is processed by the executable modules to check a program element or program element behavior for adherence to a rule. The cooperative interaction of these various elements will be described with further reference to FIG. 2, which illustrates a flowchart of a method 300 for checking a program element for adherence to a rule. Accordingly, FIG. 2 will be described with frequent reference to FIG. 3.

In general, an appropriately configured compiler (e.g., a Microsoft® .NET compiler) can receive source code (e.g., C#, C++, or Visual Basic source code) and compile the source code into language independent portable executables containing metadata and intermediate language instructions. Metadata describes the types, members (e.g., methods, fields, properties, events), and attributes defined in the source code. Intermediate language instructions are operation codes that perform operations on portions of metadata (e.g., metadata tokens) when a portable executable is executed. A just-in-time compiler that translates language independent portable executables into machine specific executable code can facilitate the coordination of operation codes and portions of metadata at the time of execution. Rule assembly 201 and target assembly 211 can each be language independent portable executables. Accordingly, rules developed in one computing environment (e.g., in C++ at a computer system running a Unix operating system) can more easily be used to analyze program elements and/or program element behaviors developed in another different computing environment (e.g., in C# at a computer system running a Microsoft® Windows operating system).

Figure 3:
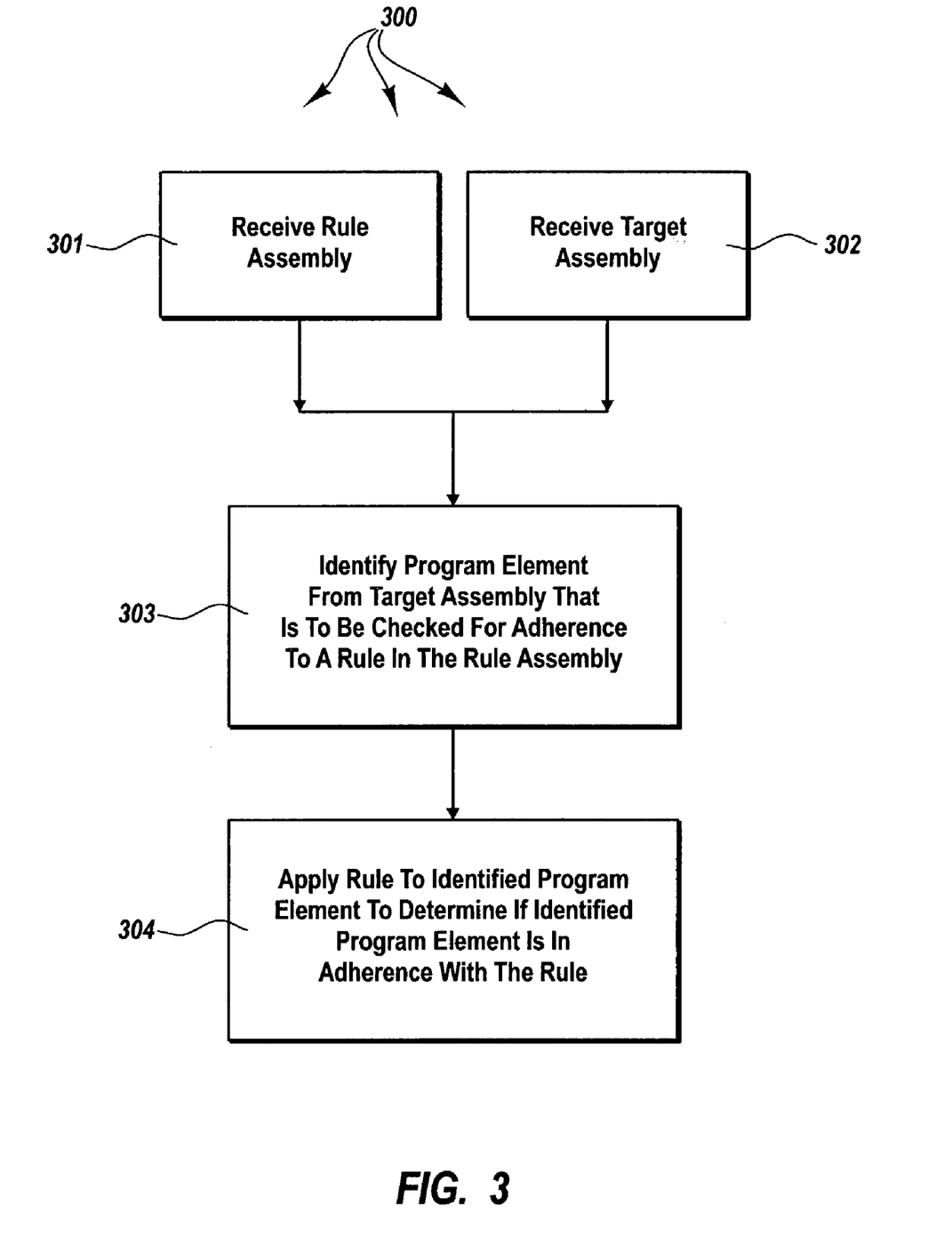
FIG. 3 illustrates a flowchart of a method for checking a target assembly for adherence to a rule in a rule assembly.

The method 300 includes an act of receiving a rule assembly (act 301). Act 301 can include receiving a rule assembly that includes a software development rule. For example as illustrated by arrow 251, analysis engine 215 receives rule assembly 201. Metadata 202 and intermediate language instructions 203 collectively represent one or more rules, such as, for example, software development rules, that target particular program elements or program element behaviors.

A just-in-time compiler can coordinate combining metadata 202 and intermediate language instructions 203 into machine specific executable code for checking a program element or program element behavior for adherence to a rule. Rule assembly 201 can include rules for checking any of a variety of different characteristics of a program element or program element behavior, including: design rules for enforcing consistency across a library, usage rules for identifying program errors, performance rules for finding areas in which performance can be improved, naming rules enforcing naming conventions across a library, security rules for investigating for security holes, globalization rules for identifying cross cultural issues, interoperability rules for identifying problem areas of object interoperability, reliability rules for enforcing higher requirements to prepare an assembly for a particular implementation, reporting rules for reporting information, versioning rules for identifying code problems between framework versions, and invalid call sequence identification rules. Some more specific rules are, for example, spell checking of resource streams and Application Programmer Interface ("API") names, discovering all exceptions that may be thrown form a given method, and discovering "dead code" that would never be called. Invalid call sequence identification rules can, through examination of intermediate language instructions, build up and report a list of the discovered exceptions raised by a method. Further, invalid call sequence identification rules can be implemented to use call graphs and walk call sites in intermediate language instructions to verify correct API usage.

Rules can be implemented as types (classes). A rule can target a specific kind of program element (e.g., an assembly, a type, a method, a constructor, or an attribute). The granularity of rules can be configured by a rule developer. For example, a rule developer may develop a general rule that checks the names of all programming elements for specified characteristics. Alternately, a rule developer may develop a more specific rule that only checks the names of fields for specified characteristics. In some object oriented programming environments, it may be that a first programming element "is" of a type of a second programming element. Accordingly, a rule that targets the second programming element may also inherently target the first programming element. For example, a rule that targets members may also inherently target methods, fields, properties, and events.

A rule can target a specific kind of program element behavior. A rule that targets program element behavior may target specific operation codes or sequences of operation codes included in intermediate instructions. For example, to conserve resources a rule may require that numbers be incremented using an increment operator (e.g., x++) instead of adding 1 (e.g., x=x+1). Accordingly, the rule can target the operation code or sequence of operation codes that represent the "+" operator A rule can expose a callback or an entry point to analysis engine 215 that can be used to determine if a program element or program element behavior is in adherence with the rule. A rule can be self-descriptive such that the rule characteristics that describe, for example, the rule's friendly name, purpose, ownership, and priority. The priority can indicate to an analysis engine a level of importance associated with adhering to the rule.

Rules that target types and members (e.g., methods and fields) are not required to target all occurrences of the type or member. Published flags can be used to narrow targets for a rule. For example, flags can be used to specify accessibility levels (e.g., protected, private, public, internal, etc.). These accessibility levels can limit a rule to types and members within a given visibility (e.g., within a class that declared the type or member or in a class derived from the class that declared the type or member). For example, a rule from rule assembly 201 that targets methods can set its protection level to indicate to analysis engine 215 that that the rule checks only methods in public types. A rule can specify target program elements or target program element behaviors, by implementing an appropriate interface that extends a base interface containing properties that are defined for every rule, such as, for example, the rule's friendly name and the rule's textual description.

Accordingly, a rule can be defined as a class that is implemented to a certain interface. When analysis engine 215 receives a rule assembly, analysis engine 215 can load a separate interface for each targeted program element and each targeted program element behavior contained in the rule assembly. Thus, the number of interfaces can expand when analysis engine 215 receives a new rule (i.e., becomes capable of analyzing a new program element or a new program element behavior). On the other hand, the number of interfaces is potentially reduced when analysis engine 215 unloads a rule. Examples of the some of the possible interfaces are ITypeRule for Type program elements, IMethodRule for Method program elements, and IResourceStreamRules for assembly resource streams.

These interfaces are not necessarily mutually exclusive; an IMemberRule interface may run on all members (e.g., methods, properties, fields, events), while an IMehtodRule interface would only run on methods. Additionally, a rule may declare program elements to further refine the program elements or program element behaviors it will analyze. For example, a rule may declare that it will only analyze public program elements. Accordingly, a programmer (or tester) has increased control over the program elements and/or program element behaviors that are checked as well as the adherence policies that are checked for the program elements and/or program element behaviors.

Many computer languages, such as, for example, C++, C#, and Visual Basic, can be used to create rules. The following portion of source code is a first example rule (that may be included in rule assembly 201) to check method names for adherence to Pascal Casing (i.e., capitalizing the first letter of each new word). The first example rule is written in the C# computer language:

```
1.  public class MethodNamesArePascalCased:IMethodRule
2.  {
3.     public string MethodNamesArePascalCased( ) { }
4.     string IMethodRule.Check(Method method)
5.     {
6.        string name = method.Name;
7.
8.        if (!NamingRuleUtilities.IsPascal(name))
9.        {
10.          return String.Format("The name '{0}' does not adhere to Pascal naming
                convention please consider renaming to '{1}'.", name,
                NamingRuleUtilities.PascalCase(name));
11.       }
12.       return null;
13.    }
14.
15.    public string NamingConvention
          { get { return "Method names are Pascal cased"; } }
16.
17.    public string Description
          { get { return "Use Pascal naming convention for all methods."; } }
18.
19.    public string LongDescription
          { get { return "Pascal naming convention capitalizes the first letter of each word, as
             in BackColor. Use Pascal naming convention for all method names having
             compound words."; } }
19.
```

```
-continued 20.     public string GroupOwner
            { get { return "QA Department"; } }
21.
22.     public string DevOwner
            { get { return "Jane Developer"; } }
23.
24.     public string Url
            { get { return "http://www.example.com"; } }
25.
26.     public string Email
            { get { return "JaneD@example.com"; } }
27.     public int Priority
            { get { return 1; } }
28.
29.  }
```

The numbers at the beginning of some lines of the first example rule are line numbers that will be used in describing the first example rule. However, these line numbers are not part of the source code. When a line does not include a line number this indicates that the line is included as part of a previously numbered line. Line 1 indicates that the first example rule is of a class "MethodNamesArePascalCased" and has a corresponding interface of "IMethodRule". The IMethodRule interface can be an extension of a base "IRule" interface that contains properties defined for every rule, such as, for example, a friendly name and textual description. The basic IRule interface can include a "Check" method that takes parameters specific to method programming elements.

Line 3 defines the method MethodNamesArePascalCased of a type string. Accordingly, the method MethodNamesArePascalCased can return a string value. Line 4 represents the interface for the IMethodRule Check method. The Check method is defined to return a string as output and accept an input value for a "method" variable that is of the data type MethodInfo. The input value for the method variable can represent a method that was identified through reflection as a method that is to have its name checked for adherence to Pascal naming convention.

Line 6 defines a "name" variable as a string and sets the value of the name variable equal to the method name of the method represented by the method variable. An "IsPascal" method (defined in a NamingRuleUtilities class) takes the method name (i.e., the value of the name variable) as input at line 8. The IsPascal method checks the method name for adherence to Pascal Naming convention. The IsPascal method then returns a Boolean value indicating whether or not the value of the method name adheres to Pascal naming convention. When the name does not adhere to Pascal naming convention, the string at line 10 is returned. This string can be presented to a developer to indicate the non-adhering name. A "PascalCase" method (defined in a NamingRuleUtilities class) can provide an alternate name that adheres to Pascal naming convention.

Lines 15 through 27 define resources that can be used to present additional information to a developer. Line 27 indicates the priority of the MethodNamesArePascalCased rule. A priority can indicate a relative level of importance for adhering to a rule relative to other rules. When there is an increased level of importance associated with adhering to a rule, the rule's priority can be increased (e.g., to priority 1). On the other hand, when there is a decreased level of importance associated with adhering to a rule, the rule's priority can be decreased (e.g., to priority 10). Higher priority rules can indicate that non-adherence is required to be corrected before a target assembly is finalized (e.g., because the assembly may cause errors in other assemblies during run-time). Intermediate priority can indicate that non-adherence should be corrected but is not required to be corrected (e.g., for conformance with uniform naming conventions). Lower priority rules may simply be suggestions, such as, for example, to make an assembly more understandable.

In some embodiments, a rule references a resource stream to retrieve text strings (or other appropriate information) that can be presented to a developer. The following portion of source code is a second example rule (that may be included in rule assembly 201) to check method names for adherence to Pascal Casing. The second example rule is also written in the C# computer language:

```
1.  public class MethodNamesArePascalCased:NamingRule, IMethodRule
2.  {
3.      //Constructor
4.      public MethodNamesArePascalCased( ):
5.          //Type name of the rule
6.          base("MethodNamesArePascalCased",
7.          //Name of an XML resource stream
8.              "RulesResourceStream",
9.          //Assembly that contains the resource stream
10.             typeof(MethodNamesArePascalCased.Assembly)) { }
11.
12.     string IMethodRule.Check(Method method)
13.     {
14.         string name = method.Name;
15.
```

-continued

```
16.        if (!NamingRuleUtilities.IsPascal(name))
17.        {
18.            return GetResolution(name, NamingRuleUtilities.PascalCase(name));
19.        }
20.        return null;
21.    }
22. }
```

The numbers at the beginning of each line of the second example rule are line numbers that will be used in describing the second example rule. However, these line numbers are not part of the source code. When a line does not include a line number this indicates that the line is included as part of a previously numbered line. Lines preceded by a double slash ("//") are comments that aid in the description of the second example rule. Line 1 indicates that the second example rule is of a class "MethodNamesArePascalCased", which is a sub-class of "NamingRule", and has a corresponding interface of "IMethodRule".

Lines 3 through 10 represent a constructor for the MethodNamesArePascalCased class. The constructor indicates that instances of the MethodNamesArePascalCased class are to be derived by calling a base constructor from the NamingRule class (the base class). The base constructor is called with a value of "'MethodNamesArePascalCased'" (line 6), a value of "'RulesResourceStream'" (line 8), and a value of "typeof(MethodNamesArePascalCased).assembly" (line 10). The NamingRule class can have a corresponding constructor that receives a type name of a rule, the name of an XML resource stream, and an assembly that receives the resource stream. Accordingly, the base constructor can be utilized to create an instance of a MethodNamesArePascalCased rule that has access to a file (typeof(MethodNamesArePascalCased).assembly) containing an XML resource stream named RulesResourceStream. Use of a resource stream allows rules to be more easily localized (as compared to including hard-coded string values in a rule) and reduces the resources needed to create reports on rules. Alternately, string variables can be defined within the MethodNamesArePascalCased rule such that resources for the MethodNamesArePascalCased rule are contained in the MethodNamesArePascalCased rule.

Line 12 represents the interface for the IMethodRule Check method. The Check method is defined to return a string as output and accept an input value for a "method" variable that is of the data type MethodInfo. The input value for the method variable can represent a method that was identified through reflection as a method that is to have its name checked for adherence to Pascal naming convention.

Line 14 defines a "name" variable as a string and sets the value of the name variable equal to the method name of the method represented by the method variable. An "IsPascal" method (defined in a NamingRuleUtilities class) takes the method name (i.e., the value of the name variable) as input at line 16. The IsPascal method checks the method name for adherence to Pascal Naming convention. The IsPascal method then returns a Boolean value indicating whether or not the value of the method name adheres to Pascal naming convention.

When the method name does not adhere to Pascal Naming convention, execution proceeds to line 18. Line 18 returns output from a "GetResolution" method that provides a suggestion on how to resolve the non-adhering method name. The GetResolution method can be defined in the NamingRule class to access the XML resource stream RulesResourceStream (e.g., converted from RulesResourceStream.xml). The GetResolutionMethod retrieves appropriate resources to combine with the method name and a suggested corrected method name that will adhere to Pascal naming convention (received from a "PascalCase" method defined in the NamingRuleUtilities class).

Accordingly, the GetResolution method can be called with the method name and a suggested corrected method name and can return a possible resolution for a non-adhering method name. The GetResolution method could return, for example, the following textual message "storemaxValue does not adhere to Pascal naming convention, one possible resolution is to rename the method StoreMaxValue". On the other hand, when the name variable does adhere to Pascal name convention execution proceeds to line 13 and a null value is returned (indicating adherence).

In addition to text strings representing possible resolutions for non-adhering program elements or program element behaviors other types of rule data, such as, for example, the name of the author of the rule, a description of a rule, and a rule priority. The following portion of text is an example of XML instructions representing a resource stream that includes resources for the MethodNamesArePascalCased rule:

```
1.  <?xml version="1.0" encoding="UTF-8"?>
2.  <Rules>
3.    <Rule name="MethodNamesArePascalCased">
4.      <Name>Method names are Pascal cased</Name>
5.      <Description>Use Pascal naming convention for all methods.</Description>
6.      <LongDescription> Pascal naming convention capitalizes the first letter of each word,
as in BackColor. Use Pascal naming convention for all method names having compound
words.</LongDescription>
7.      <GroupOwner>QA Department</GroupOwner>
8.      <DevOwner>Jane Developer</DevOwner>
9.      <Url>http://www.example.com</Url>
10.     <Email>JaneD@example.com</Email>
11.     <Priority>1</Priority>
```

-continued

```
12.    <Resolution>The name '{0}' does not adhere to Pascal naming convention please
consider renaming to '{1}'.</Resolution>
13.      </Rule>
14.         .
15.         .
16          .
17.   </Rules>.
```

The numbers at the beginning of each line of the example test cases are line numbers that will be used to clarify the description of the example test case. However, these line numbers are not part of the XML resource stream. Resource-based rules can access data from the resource stream through corresponding "Get" methods, such as, for example, GetPriority, GetName, or the GetResolution method from the example rule described above. Accordingly, a rule can access data associated with the rule even though the data is not contained in the rule. The series of three periods at lines 14–16 (vertical ellipsis) indicates that resources for other resource-based rules can be included in the example resource stream.

The {0} and {1} at line 12 represent two arguments that a check method, such as, for example, the check method from the MethodNamesArePascalCased rule, will supply at runtime. In the previous example rule, these arguments could be a non-adhering method name and a suggested corrected method name. The resources at lines 4 through 11 of the example XML instructions correspond to the resources at lines 15 through 27 in the first example rule. Accordingly, the second example rule can present information similar to the first example rule to a developer.

An appropriate converter can be utilized to convert the example XML instructions into a resource stream that is accessible to analysis engine 215.

The method 300 includes an act of receiving a target assembly (act 302). Act 302 can include receiving a target assembly containing one or more program elements and/or one or more program element behaviors. For example as illustrated by arrow 249, analysis engine 215 receives target assembly 211. Metadata 212 can represent one or more program elements and intermediate language instructions 213 can represent one or more program element behaviors. Target assembly 211 can be an assembly that is to be checked for adherence to the rule contained in rule assembly 201.

The method 300 includes an act of identifying a program element (or program element behavior) from the target assembly that is to be checked for adherence to a rule in the rule assembly (act 303). For example, analysis engine 215 can identify a program element from target assembly 211 that is to be checked for adherence to a rule in rule assembly 201. As rule assemblies are received by analysis engine 215, analysis engine 215 can maintain a list of rules indicating rules that are targeted to particular program elements and program element behaviors. Rules can advertise to analysis engine 215, for example, through applied attributes or through other Metadata (e.g., using the shape of the rule API), the targeted program elements or targeted program element behaviors. Analysis engine 215 can identify applied attributes (e.g., through reflection) for each rule in a rule assembly when the rule assembly is received. Alternately, intermediate instruction retrieval module 217 can access rule intermediate instructions 203 and identify the behaviors of the rules in a rule assembly. From the identified rule behaviors, analysis engine 215 may be able to determine the programming elements and/or programming element behaviors targeted by a rule.

When analysis engine 215 receives target assembly 211, reflection module 216 can iterate through program elements in metadata 212 to identify rules that target particular program elements. For example, when metadata 211 includes a method, reflection module 216 may identify one or more method rules (e.g., rules implementing an IMethodRule interface) for checking the method. When appropriate, analysis engine 215 may also identify one or more member rules (e.g., rules implementing an IMemberRule interface) for checking the method. Accordingly, reflection module 216 may identify a plurality of program elements, each of which is the target of a plurality of different rules.

Similarly, when analysis engine 215 receives target assembly 211, intermediate instruction retrieval module 217 can iterate through program element behaviors to identify rules that target particular program element behaviors. For example, when target intermediate instructions 213 includes operation codes for incrementing a number, intermediate instruction retrieval module 217 may identify one or more rules for checking how the number is incremented. For example, to conserve resources a rule may require that numbers be incremented using an increment operator (e.g., x++) instead of adding 1 (e.g., x=x+1). The rule can check operation codes that cause the number to be incremented to determine if operation codes representing the increment operator or the addition operator are being used. When the addition operator is being used, a resolution message from a resource stream can be output. Accordingly, intermediate language retrieval module 217 may identify a plurality of program element behaviors, each of which is the target of a plurality of different rules.

The method 300 includes an act of applying the rule to the identified program element (or identified program element behavior) to determine if the identified program element (or identified program element behavior) is in adherence with the rule (act 304). For example, adherence module 218 can apply a rule from rule assembly 201 to a program element or program element behavior from target assembly 211. When appropriate, adherence module 218 can dynamically invoke (instantiate) a rule to cause the rule to be created in system memory. Adherence module 218 can then execute the rule against the program element or program element behavior to check the program element or program element behavior for adherence to the rule. The results of applying a rule to a program element or program element method can be stored for viewing by a programmer or tester. For example, as illustrated by arrow 253 results are output to analysis results 204 for storage.

Figure 4:
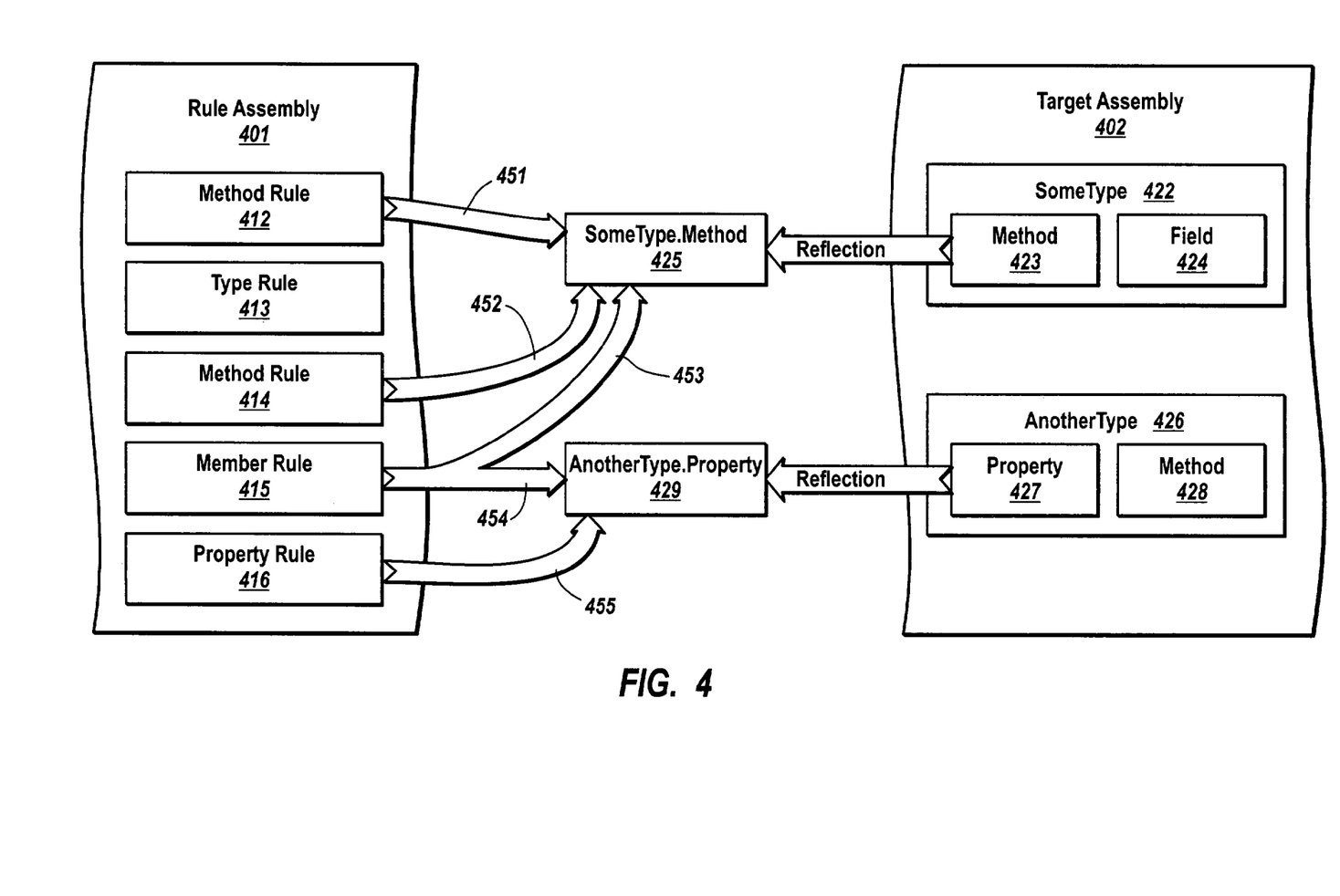
FIG. 4 illustrates an example of reflection identifying program elements in a target assembly that correspond to rules in a rule assembly.

FIG. 4 illustrates an example of how reflection can be used to identify rules that correspond to program elements represented in metadata. Rule assembly 401 includes rules 412 through 416 that target particular kinds of program elements. Rules 412 and 414 are directed to methods, rule 413 is directed to types (classes), rule 415 is directed to members, and rule 416 is directed to properties. Target assembly 402 includes SomeType 422 and AnotherType 426. Each of the types in FIG. 4 can include a plurality of programming elements and programming element behaviors. However, to simplify the description of FIG. 4 only some of the program elements are depicted. For example, SomeType 422 is depicted as including Method 423 and Field 424 and AnotherType 426 is depicted as including Property 427 and Method 428. The arrows labeled "Reflection" indicate that a reflection module (e.g., reflection module 216) has identified Method 423 and Property 427. A reflection module can reference Method 423 and Property 427 as SomeType.Method 425 and AnotherType.Property 429 respectively.

Upon loading a corresponding rule assembly, method rule 412 and method rule 414 may have indicated to analysis engine 215 that they are targeted to methods. Similarly, member rule 415 may have indicated to analysis engine 215 that it is targeted to members. Accordingly, analysis engine 215 can identify that method rule 412, method rule 414, and member rule 415 (since a method may be a member) are to be applied to SomeType.Method 425. As indicated by arrows 451, 452, and 453, method rule 412, method rule 414, and member rule 415 are each applied to SomeType.Method 425. Method rule 412, method rule 414, and member rule 415 can each have a corresponding check method that is executed to check SomeType.Method 425 for adherence.

Upon loading a corresponding rule assembly, property rule 416 may have indicated to analysis engine 215 that it targets properties. Accordingly, analysis engine 215 can identify that member rule 415 (since a property may be viewed as a member) and property rule 416 are to be applied to AnotherType.Property 429. As indicated by arrows 454 and 455, member rule 415 and property rule 416 are each applied to AnotherType.Method 429. Member rule 415 and property rule 416 can each expose a corresponding callback or entry point to analysis engine 215 that can be utilized by analysis engine 215 to check AnotherType.Property 429 for adherence.

Although FIG. 4 illustrates using reflection to identify program elements, intermediate language retrieval can be used in a similar manner to identify rules that correspond to program element behaviors. For example, upon loading a corresponding rule assembly, one or more behavior rules can indicate to analysis engine 215 that they target particular intermediate language instructions (e.g., particular operation codes or sequences of operational codes). An intermediate instruction retrieval module (e.g., intermediate instruction retrieval module 217) can identify language instructions from a target assembly that are targeted by one or more behavior rules. The one or more behavior rules can be applied to identified intermediate language instructions. The one or more behavior rules can each have a check method that is executed to check identified intermediate language instructions for adherence.

In some embodiments, an analysis engine (e.g., similar to analysis engine 215) is included in an Integrated Development Environment ("IDE") having an integrated development interface for interfacing with standard development tools (e.g., an editor, compiler, and debugger) used to develop assemblies. Accordingly, when an assembly is under development, the program elements and program element behaviors in an assembly can be checked for adherence to software development rules. The software development rules can supplement inherent rules implemented by the standard development tools (e.g., inherent rules to check for syntactical errors or other errors that can cause an assembly to fail to execute at runtime). An IDE can load rule assemblies during startup or can load rule assemblies dynamically as a desire to check for adherence to particular rules is indicated by a programmer. For example, a compiler could take set of rules as input, compile the source code into assemblies, run the rules on the target assemblies, and report all rule violations together with compilation warnings.

In some embodiments, the analysis engine accesses program data in the form of metadata and/or intermediate language instructions. The analysis engine can access metadata and/or intermediate language instructions, for example, in response to receiving a user-entered compile command at the integrated development interface. Thus, depending on configuration of an IDE, metadata and/or intermediate instructions can be accessed.

The analysis engine can identify that one or more program elements and/or or one or more program element behaviors contained in the accessed program data are to adhere to software development rules. Accordingly, this may include identifying metadata, and/or intermediate language instructions that are to adhere to software development rules. Software development rules are applied to the identified program elements and/or identified program element behaviors to check (e.g., by implementing appropriate check methods) for adherence to the software development rules. Results of the checks can be output at the integrated development interface for viewing.

Thus, depending on IDE configuration, a programmer can be made aware of potential non-adhering source code at the time source code is compiled into an assembly. Resolution messages can be output at the integrated development interface as a programmer compiles source code and without the programmer having to enter a specific command to check for adherence to software development rules. When appropriate, resolution of non-adhering source code can be automatically corrected on the display of the integrated development interface. For example, the analysis engine may automatically implement a suggested correction (e.g., a suggested corrected method name) that would otherwise be output with text from a resource stream.

What is claimed and desired secured by United States Letters Patent is:

1. In a computer system that is capable of creating program elements in system memory and executing program element behaviors in system memory, a method for checking executable code to determine if corresponding source code adheres to a software development rule, the method comprising the following:

an act of receiving a rule assembly containing one or more software development rules;

an act of detecting a targeted software development rule included in the rule assembly in response to the rule assembly advertising that it includes the targeted software development rule, the targeted software development rule being targeted to a specified program element or a specified program element behavior within language independent portable executables such that source code compiled to generate a language independent portable executable can be checked for adherence to the targeted software rule independent of any programming languages used to create the source code;

an act of receiving a language independent portable executable target assembly that was compiled from corresponding source code of a programming language, the language independent portable executable target assembly containing metadata and intermediate language instructions, the metadata describing at least one program element defined in the corresponding source code, the intermediate language instructions including operation codes configured to perform operations on portions of the metadata when the language independent portable executable target assembly is executed to cause at least one program element behavior to occur for a program element defined in the corresponding source code;

an act of identifying the specified program element or the specified program element behavior within the language independent portable executable target assembly thereby indicating that the specified program element or the specified program element behavior is to be checked to determine if the source code compiled to generate the specified program element or specified program element behavior adheres to the targeted software development rule contained in the rule assembly; and an act of applying the targeted software development rule to the specified program element or the specified program element behavior in the language independent portable executable target assembly to determine if the source code compiled to generate the specified program element or the specified program element behavior adheres to the targeted software development rule such that adherence to the targeted software development rule can be checked for source code in any of a plurality of different programming languages without regard for the specific programming language of the corresponding source code compiled to generate the language independent portable executable target assembly.

2. The method as recited in claim 1, wherein the act of receiving a rule assembly containing one or more software development rules comprises an act of receiving metadata and intermediate language instructions that can be used to implement the targeted software development rule in system memory.

3. The method as recited in claim 1, wherein the act of receiving a rule assembly containing one or more software development rules comprises an act of receiving a targeted check method that can be executed to check for adherence to the software development rule.

4. The method as recited in claim 1, wherein the act of receiving a rule assembly containing one or more software development rules comprises an act of receiving a rule assembly having an interface that is targeted to a particular kind of program element defined in the source code compiled to generate the language independent portable executable target assembly.

5. The method as recited in claim 1, wherein the act of receiving a rule assembly containing one or more software development rules comprises an act of receiving a rule assembly having an interface that is targeted to a particular intermediate language operation code defined in the source code compiled to generate the language independent portable executable target assembly.

6. The method as recited in claim 1, wherein the act of receiving a rule assembly containing one or more software development rules comprises an act of receiving a rule that is targeted to a program element having a particular level of accessibility.

7. The method as recited in claim 1, wherein the act of receiving a rule assembly containing one or more software development rule comprises an act of receiving a software development rule targeted to programming elements of a specified priority level.

8. The method as recited in claim 1, wherein the act of receiving a rule assembly containing one or more software development rules comprises an act of receiving a software development rule that accessing resources from a resource stream.

9. The method as recited in claim 1, wherein the act of receiving a rule assembly containing one or more software development rules comprises an act of receiving a software development rule that accessing resources contained in the software development rule.

10. The method as recited in claim 1, wherein the act of receiving a rule assembly containing one or more software development rules comprises an act of receiving a language independent portable executable rule assembly.

11. The method as recited in claim 1, wherein the act of identifying a program element or program element behavior that is to be checked for adherence to the targeted software development comprises an act of using reflection to identify a portion of metadata contained in the language independent portable executable target assembly.

12. The method as recited in claim 1, wherein the act of identifying the specified program element or specified program element behavior that is to be checked for adherence to the targeted software development rule comprises an act of using intermediate instruction retrieval to identify one or more operation codes, that when executed, cause the specified program element behavior.

13. The method as recited in claim 1, wherein the act of applying the targeted software development rule to the specified program element or the specified program element behavior comprises an act of executing a check method for an interface that is targeted to the specified program element.

14. The method as recited in claim 1, wherein the act of applying the targeted software development rule to the specified program element or the specified program element behavior comprises an act of executing a check method to check a portion of metadata contained in the language independent portable executable target assembly.

15. The method as recited in claim 1, wherein the act of applying the software development rule to the specified program element or the specified program element behavior comprises an act of executing a check method for an interface that is targeted to the specified program element behavior.

16. The method as recited in claim 1, wherein the act of applying the targeted software development rule to the specified program element or the specified program element behavior to check the specified program element or the specified program element behavior for adherence to the software development rule comprises an act of executing a cheek method to check one or more operation codes contained in target assembly, that when executed, cause the specified program element behavior.

17. The method as recited in claim 1, wherein the act of applying the targeted software development rule to specified program element or the specified program element behavior comprises an act of instantiating the targeted software development rule.

18. The method as recited in claim 1, further comprising:
an act of outputting the results of checking the specified program element or specified program element behavior for adherence to the targeted software development rule.

19. The method as recited in claim 18, wherein the act of outputting the results of checking the specified program element or specified program element behavior for adherence to the software development rule comprises an act of outputting resources from a resource stream associated with the rule assembly.

20. The method as recited in claim 19, wherein the act of outputting resources from a resource stream associated with the rule assembly comprises an act of outputting resources that were converted from XML instructions.

21. A computer program product for use in a computer system that is capable of creating program elements in system memory and executing program element behaviors in system memory, the computer program product for implementing a method for checking executable code to determine if corresponding source code adheres to a software development rule, the computer program product comprising one or more computer-readable media having stored thereon computer executable instructions that, when executed by a processor, cause the computer system to perform the following:

receive a rule assembly containing one or more software development rules;

detect a targeted software development rule included in the rule assembly in response to the rule assembly advertising that it includes the targeted software development rule, the targeted software development rule being targeted to a specified program element or a specified program element behavior within language independent portable executables such that source code compiled to generate a language independent portable executable can be checked for adherence to the targeted software rule independent of any programming languages used to create the source code;

receive a language independent portable executable target assembly that was compiled from corresponding source code of a programming language, the language independent portable executable target assembly, the language independent portable executable target assembly containing metadata and intermediate language instructions, the metadata describing at least one program element defined in the corresponding source code, the intermediate language instructions including operation codes configured to perform operations on portions of the metadata when the language independent portable executable target assembly is executed to cause at least one program element behavior to occur for a program element defined in the corresponding source code;

identify the specified program element or the specified program element behavior within the language independent portable executable target assembly thereby indicating that the specified program element or the specified program element behavior is to be checked to determine if the source code compiled to generate the specified program element or specified program element behavior adheres to the targeted software development rule contained in the rule assembly; and apply the targeted software development rule to the specified program element or the specified program element behavior in the language independent portable executable target assembly to determine if the source code compiled to generate the specified program element or the specified program element behavior adheres to the targeted software development rule such that adherence to the targeted software development rule can be checked for source code in any of a plurality of different programming languages without regard for the specific programming language of the corresponding source code compiled to generate the language independent portable executable target assembly.

22. The computer program product recited in claim 21, wherein the one or more computer-readable media are physical media.

23. The computer program product recited in claim 21, wherein the one or more computer-readable media are system memory.

* * * * *